(12) United States Patent
Cooper et al.

(10) Patent No.: US 7,696,712 B2
(45) Date of Patent: Apr. 13, 2010

(54) MOTOR CONTROLLER PROVIDING POSITION FEEDBACK CORRECTION

(75) Inventors: Mark R. Cooper, Eden Prairie, MN (US); Thomas D. Lundell, Lakeville, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 310 days.

(21) Appl. No.: 11/846,403

(22) Filed: Aug. 28, 2007

(65) Prior Publication Data

US 2009/0058345 A1 Mar. 5, 2009

(51) Int. Cl.
*G05B 19/29* (2006.01)

(52) U.S. Cl. .................. 318/602; 318/600; 318/603; 318/632

(58) Field of Classification Search ......... 318/602, 318/600, 603, 626, 632, 638, 560
See application file for complete search history.

(56) References Cited

U.S. PATENT DOCUMENTS

| | | | | |
|---|---|---|---|---|
| 5,744,926 | A * | 4/1998 | Lai et al. ............... | 318/590 |
| 6,111,384 | A * | 8/2000 | Stagnitto ............... | 318/602 |
| 6,738,679 | B2 * | 5/2004 | Fujita et al. ........... | 700/56 |
| 6,744,233 | B1 * | 6/2004 | Tsutsui ................. | 318/560 |
| 7,132,814 | B2 * | 11/2006 | Hatada ................. | 318/610 |

* cited by examiner

*Primary Examiner*—Bentsu Ro
*Assistant Examiner*—Thai Dinh
(74) *Attorney, Agent, or Firm*—Boyle Fredrickson LLP; R. Scott Speroff

(57) ABSTRACT

A motor controller employs absolute encoder signals to periodically assess the existence of cumulative error in a position signal derived from an incremental encoder signal. In one embodiment the absolute encoder signals are extracted from commutation switches of the motor eliminating the need for a separate absolute encoder.

20 Claims, 3 Drawing Sheets

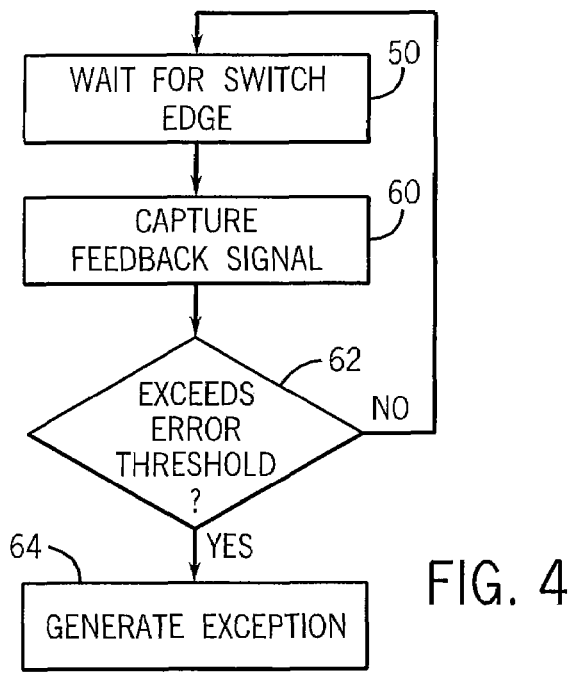
FIG. 4
FIG. 5
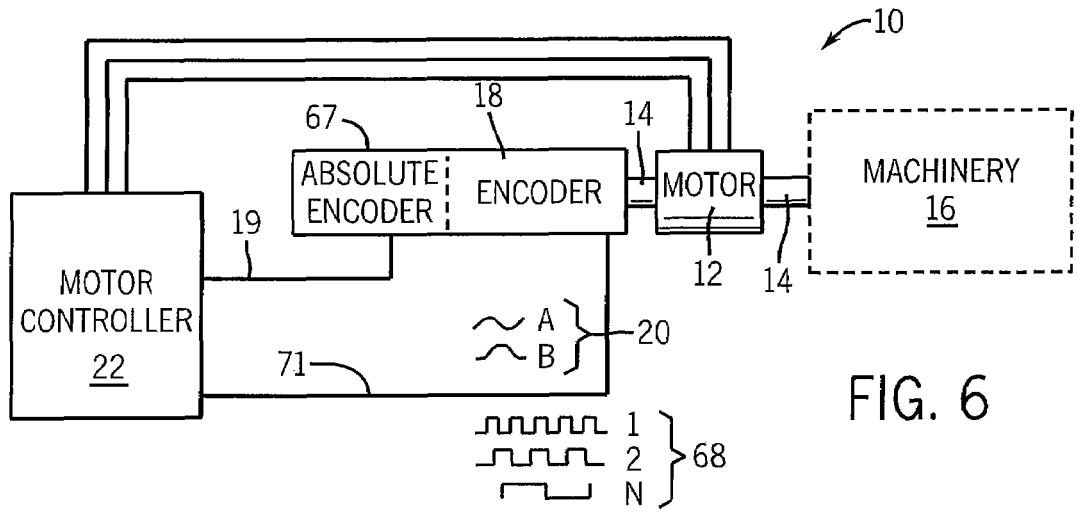
FIG. 6
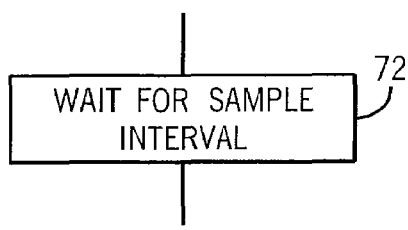
FIG. 7

MOTOR CONTROLLER PROVIDING POSITION FEEDBACK CORRECTION

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to electronic controls for motors and, in particular, to a motor controller providing correction of position feedback signals derived from incremental encoders.

Electronic motor controls regulate the electrical power to a motor to control the motor's position and velocity or other dynamic characteristics including torque, acceleration, and power efficiency. Typically, a command signal from a user, for example, a desired motor position, is received by control logic in the motor controller which compares this command signal to a corresponding feedback signal (actual motor position) to develop an error signal. The error signal may be further processed and then used to synthesize a high-power drive signal via solid-state semiconductor devices such as MOSFET transistors. These drive signals are applied to the motor windings to move the motor to reduce the error signal, in this example, to bring the motor to the position of the command signal.

The feedback signal may be produced by a position encoder attached directly to the motor or indirectly to the motor through intervening rotating machinery. As is understood in the art, the position encoder may be an absolute encoder, for example, generating a unique code (e.g., a Gray code) defining an absolute position of the rotor within a single revolution or multiple revolutions of the motor rotor. Alternatively the position encoder may be an incremental encoder (e.g., providing a pair of quadrature phased sine or square waves) defining a direction and magnitude of change of motor position but not absolute motor position. The signal from an incremental encoder may be converted to a "synthesized" absolute position signal by summing or integrating the increments of motion to a known starting or reference position.

Motor controllers may be used to control DC brushless motors. Such motors typically have a permanent magnet rotor and use a set of commutation switches connected with the rotor to detect the rotor position to switch the stator winding fields in the same manner as would be done by brushes on a standard brush type DC motor. Unlike brushes, however, the commutation switches in brushless DC motors employ non-contacting rotor position sensors, such as Hall-effect sensors, to eliminate the wear, sparking, and friction accompanying the use of brushes. For practical reasons, the circuitry of the motor controller is normally also used to provide a switching of power to the stator windings based on the signal from the commutation switches.

A typical Hall-effect commutation switch will provide multiple switch outputs that may be logically combined to determine a coarse static position of the rotor, for example, within about ±30°. This static position is sufficiently accurate to ensure that the stator currents produce the desired direction of rotor motion at startup. Once the rotor is moving, the transition "edges" of the switch outputs are used to provide a more precise indication of a dynamic rotor position.

When the motor controller employs an incremental encoder, the incremental signal may drive a "commutation counter", initialized by the commutation switches, then used in lieu of the commutation switches for precise commutation control. The incremental signal may also be used to create a synthesized absolute position signal for feedback control by initializing an accumulating counter (for example, using the commutation switches) and then updating the accumulating counter with the incremental signal.

Motor controller systems employing incremental encoders providing synthesized absolute position offer some advantages over motor controller systems employing absolute encoders. As a general matter, incremental encoders provide equivalent accuracy at lower cost and, as mentioned, can transfer data at higher rates. Nevertheless incremental encoders are subject to errors caused by electrical noise that may mask or simulate an incremental "count". Because of the accumulation or summation process used to convert the incremental encoder signal to a synthesized absolute signal, such errors can accumulate over time to fundamentally affect the accuracy of the control system.

It is known in the art to use noise suppression or detection circuitry to monitor the signal from an incremental encoder in an attempt to neutralize or detect noise induced errors. Such techniques are not always effective particularly for high-speed encoders where noise characteristics are very similar to the characteristics of the incremental encoder signal itself.

BRIEF SUMMARY OF THE INVENTION

The present invention uses a combination of incremental and absolute encoding to obtain the benefits of high data rates and low cumulative error. A first incremental encoder signal provides a high-speed position feedback signal which is periodically compared, at a lower rate, to a second absolute signal from the same or a different encoder, the latter used to monitor the signal from the incremental encoder to detect or eliminate cumulative error.

In one embodiment the commutation switches of the motor itself are used as the absolute encoder eliminating the need for a costly separate absolute encoder system.

Specifically then, the present invention provides a motor controller system for the control of an electric motor, having a first input for receiving an incremental encoder signal from an incremental encoder driven by the electric motor and a second input for receiving an absolute encoder signal from an absolute encoder driven by the electric motor. The motor controller receives a command signal for the control of the position of the electric motor and receives a position feedback signal indicating a position of the electric motor derived from the incremental encoder signal. The feedback circuit produces an error signal used to drive the electric motor. A correction circuit receiving the incremental encoder signal and the absolute encoder signal compares the two to derive a feedback error signal on a regular periodic basis for the detection of errors in the position feedback signal derived from the incremental encoder signal.

It is thus one feature of one embodiment of the invention to combine the benefits of an incremental and absolute encoder to eliminate the disadvantages of each. The high speed of the incremental encoder is combined with low cumulative error of the absolute encoder to eliminate the cumulative error of the incremental encoder while overcoming the low data rate of an absolute encoder.

The correction circuit may further provide an output to a user indicating an error in the position feedback signal exceeding a predetermined magnitude. Alternatively, the correction circuit further may correct the feedback error signal based on detected error in the position feedback signal.

It is thus one feature of one embodiment of the invention to flexibly notify the user of cumulative error in cases where remediation of an error source should be undertaken, and/or to automatically eliminate cumulative error as it is detected.

The feedback error signal may be corrected to maintain a change in the error signal caused by the correction below a predetermined magnitude.

It is thus another feature of one embodiment of the invention to allow automatic correction of cumulative error without possibly damaging high changes in the error signals being applied to the motor and its associated machinery.

The feedback error signal may be corrected incrementally over a predetermined period of time.

It is thus another feature of one embodiment of the invention to provide a simple method of reducing jumps in the control system.

The absolute encoder signal may be obtained on a periodic basis at a rate lower than a periodic basis at which the incremental error signal is obtained.

It is thus another feature of one embodiment of the invention to provide the ability to use absolute encoders that provide low angular resolution or low speed data transmission.

The absolute encoder signal may be a standard multi-bit position signal derived from an absolute encoder.

It is thus a feature of one embodiment of the invention to provide a system that will work flexibly with a wide variety of absolute encoders.

Alternatively, the absolute encoder signal may be derived from commutation signals from the electric motor.

It is thus a feature of one embodiment of the invention to provide a correction system that does not require the use and expense of an additional absolute encoder.

The absolute encoder signal is derived from Hall-effect commutation switches in the motor.

It is thus a feature of one embodiment of the invention to make use of relatively infrequent absolute encoder information such as may be provided by Hall-effect commutation switches.

The regular periodic basis may be timed to coincide with a switching of a commutation electrical signal.

It is thus a feature of one embodiment of the invention to allow precise absolute position to be obtained from commutation switches by timing the correction process to occur at switch edges of the commutation switches.

These particular features and advantages may apply to only some embodiments falling within the claims and thus do not define the scope of the invention.

BRIEF DESCRIPTION OF THE DRAWINGS

FIG. 4 is a flowchart of a program executed by the controller of FIG. 1 implementing an error notification process;

FIG. 5 is a detailed fragmentary view of the flowchart of FIG. 4 implementing an error correction process;

FIG. 6 is a figure similar to that of FIG. 1 in which the motor is connected to an absolute encoder and incremental encoder;

FIG. 7 is a fragmentary block of the flowchart of FIG. 4 showing an alternative sampling interval according to a regular periodic clock for the absolute encoder;

DETAILED DESCRIPTION OF THE INVENTION

Figure 1:
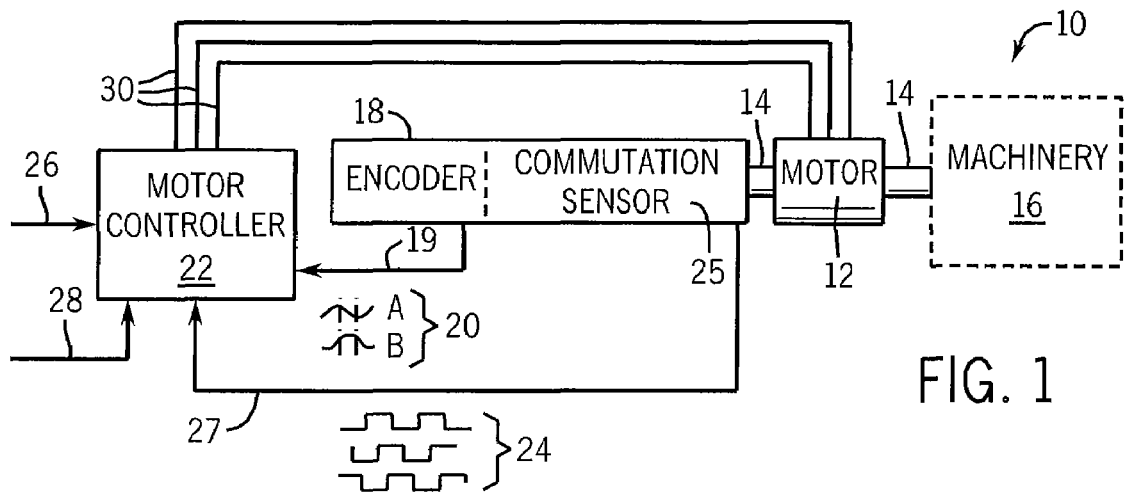
FIG. 1 is a block diagram of a position encoder system employing a brushless DC motor with commutation switches connected with an incremental encoder and communicating with the controller of the present invention.

Referring now to FIG. 1, a motor controller system 10 suitable for use with the present invention provides a permanent magnet DC motor 12 having a rotating shaft 14 connected with controlled machinery 16 where position, velocity, and/or other dynamic conditions must be controlled.

The rotating shaft 14 of the motor 12 may connect directly or indirectly with an encoder 18 providing an incremental position signal 19, for example, quadrature-phased sine waves 20, to the motor controller 22. The quadrature-phased sine waves 20 provide an indication of shaft direction based on whether one quadrature waveform is 90° advanced or 90° retarded behind the other quadrature waveform, and provide an indication of incremental shaft movement by a counting of sine wave cycles or interpolated fractions of a sine wave cycle. The encoder 18 may be connected directly to the shaft 14 of the motor 12 or connected indirectly to the shaft 14 through other rotating elements of the controlled machinery 16 possibly through the agency of additional shafts, gears, belts or the like providing relative speed increases or reductions.

The motor controller 22 may also receive commutation signals 27 from commutation sensors 25, which may be Hall-effect switches in the encoder 18. As is understood in the art, the commutation sensors 25 provide a set of staggered binary signals 24 that in logical combination divide the rotational range of the motor 12 into a set of coarse absolute sectors typically on the order of ±30°, electrical.

The motor controller 22 may also receive a command signal 26, for example, providing a commanded position or velocity signal, and a variety of user controlled parameters 28, for example programming maximum speeds, maximum acceleration rates, alarm thresholds, and the like, as are understood in the art.

Generally, the motor controller 22 processes the command signal 26, the commutation signal 27, and the incremental position signal 19 to generate drive signals 30 providing electrical power to stator windings of the motor 12 to provide the desired motion of motor 12. The motor controller 22 may be implemented as hardware, software, or a combination of both.

Figure 2:
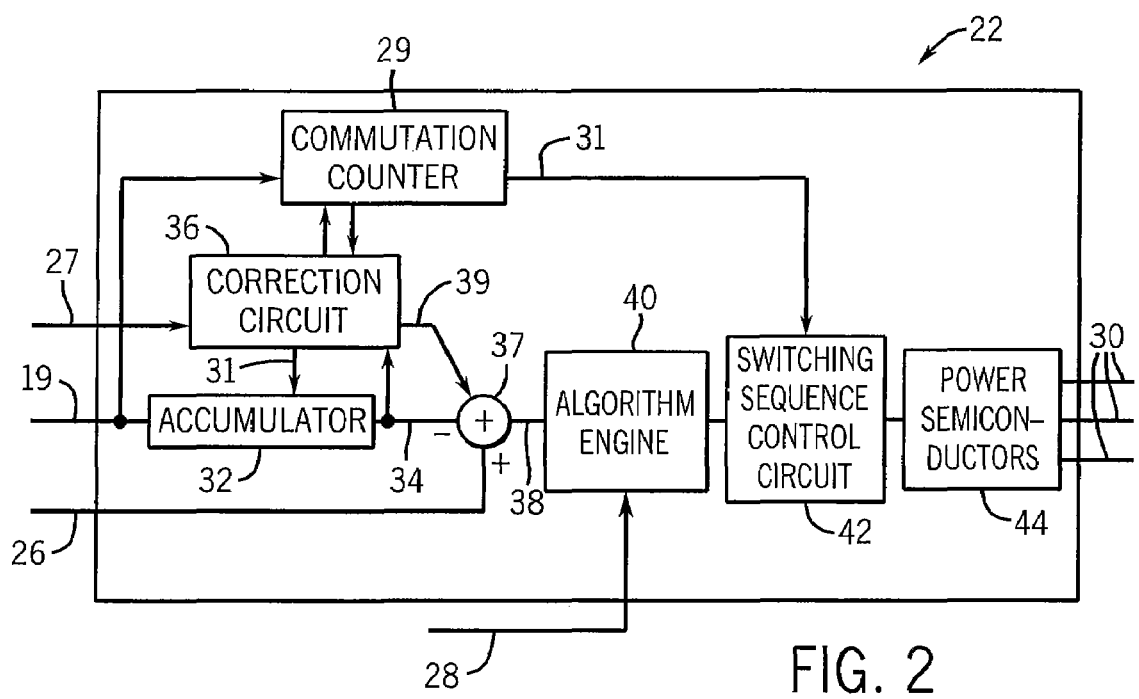
FIG. 2 is a detailed block diagram of the controller of FIG. 1 showing a correction circuit that may either correct or notify the operator of deviation in a synthesized position feedback signal derived from the incremental encoder.

Referring now to FIG. 2, as is understood in the art, upon startup of the motor controller 22 the commutation signal 27, which provides a coarse absolute position indication, is received by a correction circuit 36 and used to initialize the value of a commutation counter 29 used to generate commutation signals 31 for the motor 12. This coarse starting position is accurate enough to ensure the stator windings are energized properly to promote the desired direction of motor rotation. The starting position is then refined immediately when the correction circuit 36 first receives an "edge" of the commutation signal 27, being a switching of a commutation sensor 25 that marks a more accurate absolute position indication.

The incremental position signal 19 is also received by an accumulator 32 which in this embodiment is initialized at zero. As the motor runs, the accumulator 32 receives the incremental position signal 19 from the incremental encoder 18 and sums the magnitude and direction indicated by the incremental position signal 19 to update the synthesized absolute position 34. At this point, the synthesized absolute position 34 is used for feedback (servo) control of the motor 12.

The synthesized absolute position 34 is compared to the command signal 26 at a summing block 37 which subtracts the synthesized absolute position 34 from the command signal 26 to produce an error signal 38. This error signal 38 may be further processed by algorithm engine 40, for example, effecting a conventional proportional-integral-derivative control algorithm based on parameters 28 input by the user and controlling pre-programmed characteristics, for example maximum acceleration rate, torque and the like.

A refined error signal output from the algorithm engine 40 is provided to a switching sequence control circuit 42 also receiving the commutation signal 31. The switching sequence control circuit 42 generates control signals for power semiconductors 44 the latter which provide desired drive signals 30.

Figure 3:
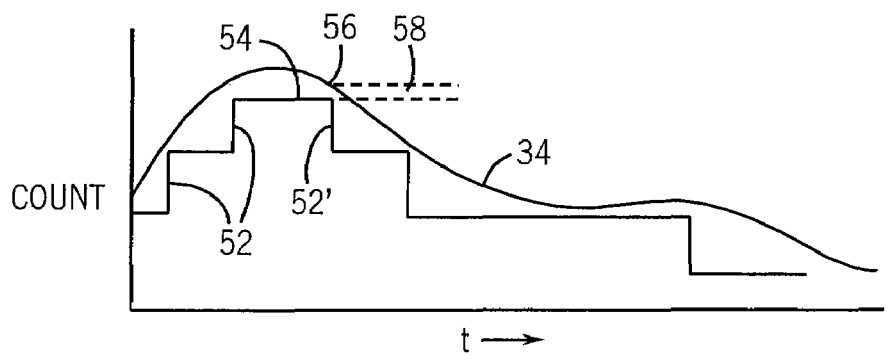
FIG. 3 is a plot of the count versus time for the synthesized position feedback signal from the incremental encoder and for an absolute position feedback signal derived from the commutation switches, showing a comparison of the two at a time of switching of the commutation switches.
Figure 8:
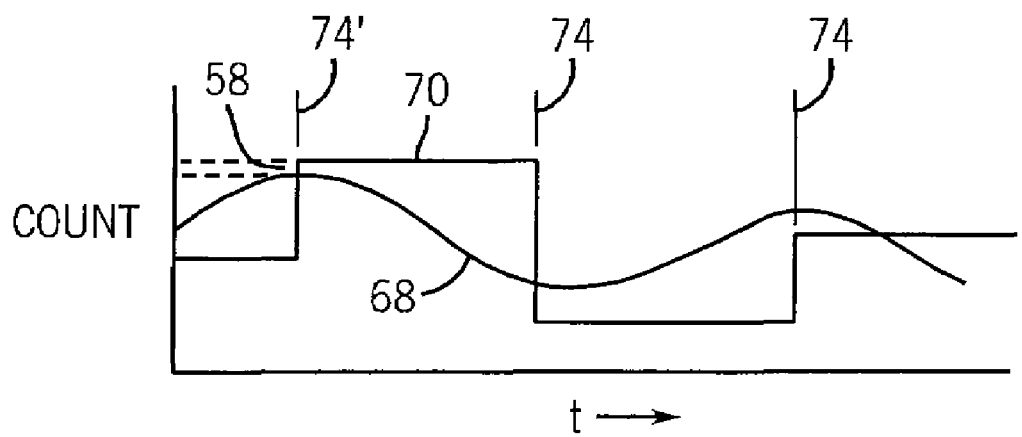
FIG. 8 is a figure similar to that of FIG. 3 showing implementation of the comparison process on a regular time basis.

Referring also to FIG. 3, in the present invention, the correction circuit 36 continues to operate after the initial rotation of the motor 12 to continually monitor the synthesized absolute position 34. Specifically, as shown in FIG. 4 and as indicated by process block 50 of a program executed by the correction circuit, the correction circuit 36 may periodically wait for edges 52 of the commutation signal 27 indicating a precise location of the rotor of the motor 12. These edges come at different times depending on the speed of the motor 12 and the correction circuit 36 may make use of only one out of a predetermined number of edges 52 as determined by the desired or expected drift of the synthesized absolute position 34.

At a given edge 52', the correction circuit 36 samples a rotor angle 54 from the commutation signal and a count value 56 indicated by commutation counter 29 as indicated by process block 60. The difference 58 between these two values represent the cumulative error in the commutation counter 29, and because the commutation counter 29 and the accumulator 32 are driven by the same incremental position signal 19, the difference 58 between these two values will also represent the cumulative error in the synthesized absolute position 34.

At decision block 62, the correction circuit 36 determines whether the differences 58 exceeds a predetermined threshold. If not, this monitoring process of blocks 50 and 60 is repeated. However, if the predetermined threshold is exceeded, a software exception is generated as indicated by process block 64. This exception causes the program implementing correction circuit 36 to provide a notification to the user, for example through an attached human machine interface or front panel indicator, that there is a cumulative error in the position feedback signal derived from the incremental encoder 18. This allows the operator to investigate and possibly take corrective action. The exception may trigger a data logging or the like to help troubleshoot any problems.

Referring to FIG. 5, alternatively or in addition to process block 64, and as indicated by process block 66, a correction of the synthesized absolute position 34 (and the commutation signal 31 of the commutation counter 29) may be undertaken. Referring also to FIG. 2, this former correction is performed while controlling the change in the magnitude of the error signal 38 as will be affected by the correction process as indicated by arrows 39. This control of the change in the error signal 38 avoids disruption of the control process and may be done by rate limiting the change in the error signal 38 by direct intervention by correction circuit 36 or by slowly correcting the synthesized absolute position 34 over time. Thus, in this latter case, if an error of x counts is detected, this correction may be made in y increments x/y counts over y separate periods of time. In this way, large jumps in the error signal 38 are avoided.

Referring now to FIG. 6, in an alternate embodiment, a combination incremental encoder 18 and absolute encoder 67 may be attached to the motor shaft 14, directly or indirectly, so that the motor controller 22 receives not only the incremental position signals 19 but also absolute position signal 71 as represented by parallel binary signals 68. In this case, the commutation sensors 25 need not be relied upon for absolute encoder information. Instead, in this case, the absolute position signal 71 is used for the periodic assessment of the accuracy of the synthesized absolute position 34.

Figure 9:
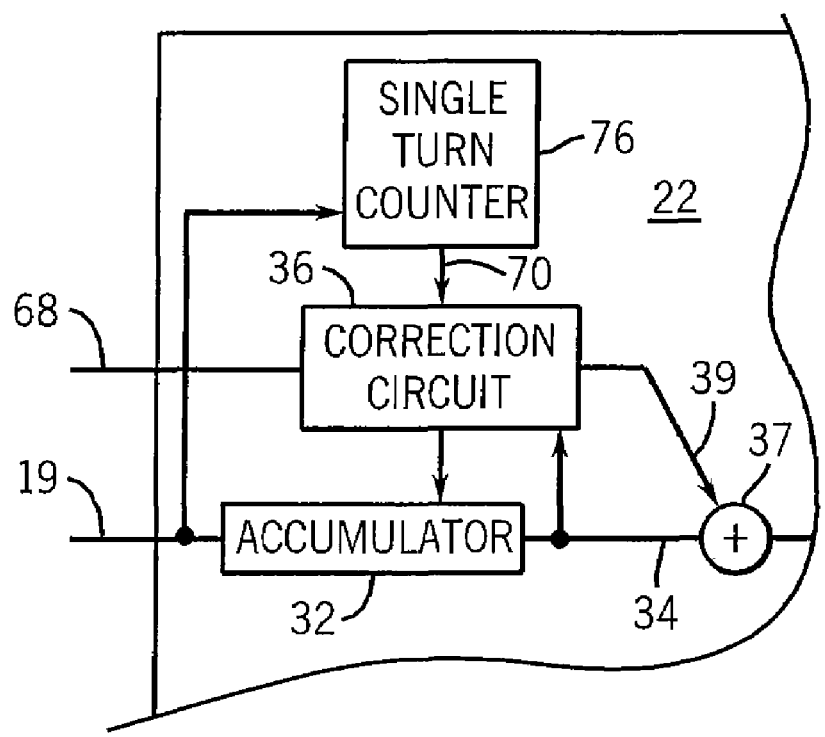
FIG. 9 is a figure similar to that of FIG. 2 showing an alternative embodiment of a controller for the encoder system of FIG. 6.

Referring then to FIGS. 4, 7, 8 and 9, the process block 50 of waiting for edge 52 in the commutation signals 27 may be replaced by process block 72 where a regular sample interval time 74 dictates times of assessment of the difference 58 between an absolute position signal 71 and the synthesized absolute position 34. The separation of the sample interval times 74 may be controlled to minimize the overhead of the correction/notification process for efficient use of computational resources. As indicated by FIG. 9, the incremental position signal 19 accumulated by accumulator 32 producing synthesized absolute position signal 34 is also received by a single turn counter 76 having a count range corresponding to the absolute encoder 18. The output 70 of this single turn counter 76 may be compared to the absolute position signal 68 (per FIG. 8) to determine a difference 58, as described above, which will also represent the error in the accumulator 32.

The present invention has been described in terms of the preferred embodiment, and it is recognized that equivalents, alternatives, and modifications, aside from those expressly stated, are possible and within the scope of the appending claims. For example, although the invention has been described in the context of rotary machinery, it is equally applicable to linear devices.

We claim:

1. A motor controller system for the control of an electric motor comprising:
   a first input for receiving an incremental encoder signal from an incremental encoder driven by the electric motor;
   a second input for receiving an absolute encoder signal from an absolute encoder driven by the electric motor;
   a feedback circuit receiving a command signal for the control of a position of the electric motor and for receiving a position feedback signal indicating a position of the electric motor derived from the incremental encoder signal, the feedback circuit producing an error signal used to drive the electric motor; and
   a correction circuit receiving the incremental encoder signal and the absolute encoder signal to compare the two to derive a feedback error signal on a regular basis for a detection of errors in the position feedback signal derived from the incremental encoder signal.

2. The motor controller system of claim 1 wherein the correction circuit further provides an output to a user indicating an error in the position feedback signal exceeding a predetermined magnitude.

3. The motor controller system of claim 1 wherein the correction circuit further corrects the feedback error signal based on detected error in the position feedback signal.

4. The motor controller system of claim 3 wherein the feedback error signal is corrected to maintain a change in the error signal caused by the correction below a predetermined magnitude.

5. The motor controller system of claim 4 wherein the feedback error signal is corrected incrementally over a predetermined period of time.

6. The motor controller system of claim 1 wherein the absolute encoder signal is obtained on a periodic basis at a rate lower than a periodic basis at which the incremental signal is obtained by the motor controller.

7. The motor controller system of claim 1 wherein the absolute encoder signal is a standard multi-bit position signal derived from an absolute encoder.

8. The motor controller system of claim 1 wherein in the absolute encoder signal is derived from commutation signals from the electric motor.

9. The motor controller system of claim 8 wherein in the absolute encoder signal is derived from Hall-effect commutation switches in the motor.

10. The motor controller system of claim 8 wherein the regular periodic basis is timed to coincide with a switching of a commutation electrical signal.

11. A method of controlling an electric motor comprising the steps of:
  (a) receiving an incremental encoder signal from an incremental encoder driven by the electric motor;
  (b) receiving an absolute encoder signal from an absolute encoder driven by the electric motor;
  (c) receiving a command signal for the control of a position of the electric motor and a position feedback signal indicating a position of the electric motor and derived from the incremental encoder signal, the feedback circuit producing an error signal used to drive and the electric motor; and
  (d) receiving the incremental encoder signal and the absolute encoder signal to compare the two to derive a feedback error signal on a regular basis for a detection of errors in the position feedback signal derived from the incremental encoder signal.

12. The method of claim 11 further including the step of correcting the feedback error signal based on detected error in the position feedback signal.

13. The method of claim 12 wherein the feedback error signal is corrected to maintain a change in the error signal caused by the correction below a predetermined magnitude.

14. The method of claim 12 wherein the feedback error signal is corrected incrementally over a predetermined period of time.

15. The method of claim 11 further including the step of providing an output to a user indicating an error in the position feedback signal exceeding a predetermined magnitude.

16. The method of claim 11 wherein the absolute encoder signal is obtained on a periodic basis at a rate lower than a periodic basis at which the incremental signal is obtained by the motor controller.

17. The method of claim 11 wherein the absolute encoder signal is a standard multi-bit position signal derived from an absolute encoder.

18. The method of claim 11 wherein in the absolute encoder signal is derived from commutation signals from the electric motor.

19. The method of claim 18 wherein in the absolute encoder signal is derived from Hall-effect commutation switches in the motor.

20. The method of claim 18 wherein the regular periodic basis is timed to coincide with a switching of a commutation electrical signal.

* * * * *